US 6,665,404 B2

(12) United States Patent
Cohen

(10) Patent No.: US 6,665,404 B2
(45) Date of Patent: Dec. 16, 2003

(54) METHOD AND DEVICE FOR POWER SUPPLY IN TELECOMMUNICATION SYSTEMS

(75) Inventor: Aharon Cohen, Oranit (IL)

(73) Assignee: ECI Telecom Ltd., Petach-Tikva (IL)

( * ) Notice: Subject to any disclaimer, the term of this patent is extended or adjusted under 35 U.S.C. 154(b) by 0 days.

(21) Appl. No.: 10/167,501

(22) Filed: Jun. 13, 2002

(65) Prior Publication Data

US 2003/0178979 A1 Sep. 25, 2003

(30) Foreign Application Priority Data

Mar. 21, 2002 (IL) ................................................ 148808

(51) Int. Cl.[7] ............................ H04M 1/00; H04M 1/24
(52) U.S. Cl. .................... 379/413; 379/413.02; 370/494
(58) Field of Search ................. 370/494, 495; 379/413, 413.02, 1.01

(56) References Cited

U.S. PATENT DOCUMENTS

| | | | | |
|---|---|---|---|---|
| 4,381,427 A | * | 4/1983 | Cheal et al. ................. | 370/216 |
| 5,774,316 A | * | 6/1998 | McGary et al. ............... | 361/42 |
| 6,005,873 A | | 12/1999 | Amit .......................... | 370/494 |
| 6,282,265 B1 | * | 8/2001 | Lowell et al. ................ | 379/25 |
| 6,549,570 B1 | * | 4/2003 | Moden et al. ............... | 375/224 |
| 6,584,197 B1 | * | 6/2003 | Boudreaux et al. ..... | 379/413.02 |

FOREIGN PATENT DOCUMENTS

| | | | |
|---|---|---|---|
| WO | WO 00/33488 A1 | 8/2000 | ........... H04B/10/00 |
| WO | WO 00/13070 A1 | 9/2000 | ......... G05B/19/418 |
| WO | WO 02/35906 A2 | 10/2002 | |

OTHER PUBLICATIONS

International Electrotechnical Commission, IEC; Safety and energy efficiency of IT equipment; Draft IEC 60950–21, Ed. 1: Safety of information technology equipment–Part 21: Remote power feeding; Mar. 16, 2001;pp. 1–16.

European Telecommunications Standards Institute; Environments Engineering (EE); Power supply interface at the input to telecommunications equipment; Part 2: Operated by direct current (dc); Draft ETSI EN 300 132–2 V2.0.0 (Dec. 2001); pp. 1–23.

* cited by examiner

*Primary Examiner*—Bao Q. Vu
(74) *Attorney, Agent, or Firm*—Nath & Associates PLLC; Harold L. Novick

(57) ABSTRACT

A device for remote line powering in a telecommunication network in which electric power is supplied via a plurality of line pairs and aggregated to provide electric power suitable for powering an appliance. The electric power supplied via each of the line pairs is adapted not to exceed a pre-defined threshold.

13 Claims, 2 Drawing Sheets

METHOD AND DEVICE FOR POWER SUPPLY IN TELECOMMUNICATION SYSTEMS

FIELD OF THE INVENTION

The present invention generally relates to telecommunication systems, and more particularly to remote line powering in telecommunication systems.

BACKGROUND OF THE INVENTION

In plain old telephone service (POTS), telephones are remotely powered by electric power drawn from a central office (CO) and therefore supply of electric power to the telephones is independent of supply of conventional main alternating-current (AC) electric power to subscriber premises. The evolvement of new and sophisticated telephone and data services introduced new appliances including new communication interfaces at subscriber premises that also require supply of electric power and therefore the demand for remote supply of electric power has increased. One form of remote powering of communication interfaces at or near subscriber premises is mentioned, for example, in U.S. Pat. No. 6,005,873 to Amit.

However, electric power supply conveyed on each telephone line twisted pair is limited due to safety requirements. Therefore, improved ways of remotely supplying electric power to appliances at or near subscriber premises while maintaining safety regulations and standards are required.

Telecommunication standards that are used to define safety requirements in remote powering and electrical parameters are described in IEC60950-21. The disclosure of this reference as well as the disclosure of the references mentioned throughout the present specification are hereby incorporated by reference.

SUMMARY OF THE INVENTION

The present invention seeks to provide improved apparatus and method for remotely supplying electric power to appliances at or near subscriber premises while maintaining safety regulations and standards.

Further objects and features of the invention will become apparent to those skilled in the art from the following description and the accompanying drawings.

There is thus provided in accordance with a preferred embodiment of the present invention a method for remote line powering in a telecommunication network, the method including supplying electric power via a plurality of line pairs that are suitable for use in the telecommunication network, and aggregating the electric power supplied via the plurality of line pairs to provide electric power suitable for powering an appliance, characterized in that the electric power supplied via each line pair of the plurality of line pairs does not exceed a pre-defined threshold. The appliance preferably includes a communications appliance.

Preferably, the electric power supplied via the plurality of line pairs is obtained by feeding along each line pair in the plurality of line pairs direct current I at an input voltage having a value within a range from $V_A$ to $V_B$, wherein the values of the current I and the input voltage are compliant with telecommunication standards for remote feeding of telecommunication circuits.

Additionally, the method includes the step of converting each said input voltage to an output voltage aggregated to provide an aggregate output voltage $V_{out}$ that is acceptable by the telecommunication standards. Further additionally, the method includes the step of converting each said input voltage to an output voltage that is acceptable by the telecommunication standards. Each converting step preferably includes the step of converting the input voltage to the output voltage for each line pair independently from other line pairs in the plurality of line pairs. More preferably, this conversion of the input voltage to the output voltage for each line pair is done full isolation from the other line pairs.

Preferably, $V_A \geqq 50$ VDC, $V_B \leqq 320$ VDC, and $I \leqq 60$ mA. The aggregate output voltage $V_{out}$ is preferably within a range from 42 VDC to 54 VDC.

The method may also preferably include the step of separately controlling the electric power supplied via each of the plurality of line pairs.

There is also provided in accordance with a preferred embodiment of the present invention apparatus for remote line powering in a telecommunication network, the apparatus including a plurality of line pair terminations terminating a corresponding plurality of line pairs that are suitable for use in the telecommunication network, the line pairs being operative to convey electric power supplied by a corresponding plurality of power sources, and an electric power aggregator operative to aggregate the electric power supplied via the plurality of line pairs to provide electric power suitable for powering an appliance, and to control that the electric power supplied via each line pair of the plurality of line pairs does not exceed a pre-defined threshold. The appliance preferably includes a communications appliance and each of the plurality of line pairs preferably includes telephone line twisted pairs.

The electric power aggregator preferably includes a plurality of separate power supervisors, wherein each separate power supervisor is operatively associated with a corresponding one of the plurality of line pair terminations.

Additionally, the electric power aggregator includes a plurality of separate controllers, wherein each separate controller is operatively associated with a corresponding one of the plurality of separate power supervisors.

Further additionally, the electric power aggregator includes a plurality of separate power stage converters, wherein each power stage converter is operatively associated with a corresponding one of the plurality of separate controllers and operative to convert an inputted voltage having a value within a range from $V_A$ to $V_B$ to an output voltage that is acceptable by telecommunication standards. More preferably, the plurality of separate power stage converters are operative in full electrical isolation from each other The apparatus additionally includes an alarm and logic unit operative to generate an alarm indicating a low voltage output level. The alarm and logic unit may further be operative to generate an indication indicating that electric power is not received over at least one line pair.

Further additionally, the apparatus includes a disconnection unit operative to detect that an output voltage $V_{out}$ resulting from aggregation of the electric power supplied via the plurality of line pairs is lower than an output voltage acceptable by telecommunication standards.

The apparatus is preferably included in a communication system that also includes the plurality of line pairs and the plurality of power sources.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
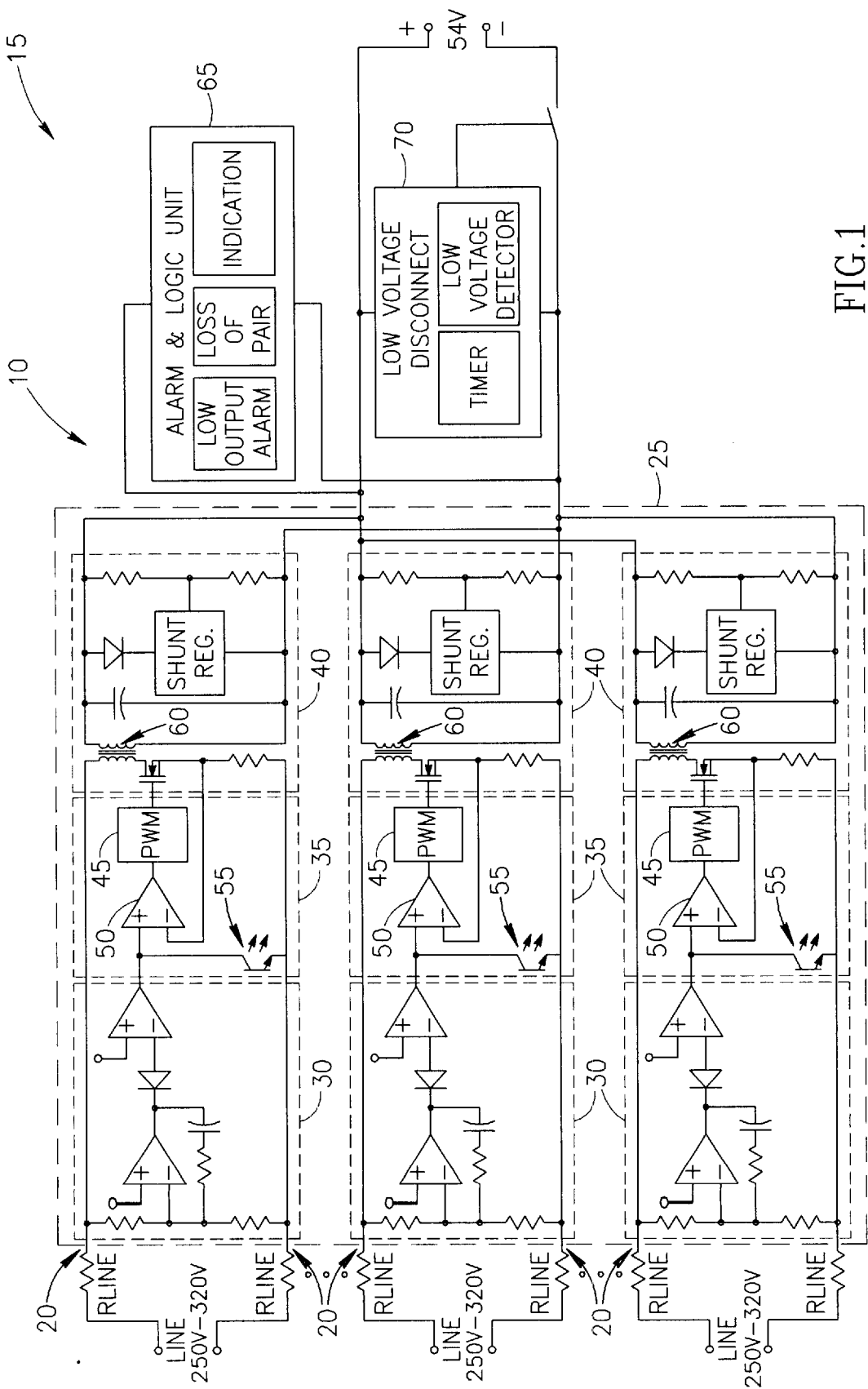
FIG. 1 is a simplified block diagram illustration of a preferred implementation of apparatus for remote line powering in a telecommunication system, the apparatus being constructed and operative in accordance with a preferred embodiment of the present invention.

Reference is now made to FIG. 1 which is a simplified block diagram illustration of a preferred implementation of apparatus 10 for remote line powering in a telecommunication system 15, the apparatus 10 being constructed and operative in accordance with a preferred embodiment of the present invention.

The apparatus 10 may preferably be located at subscriber premises (not shown) or near the subscriber premises such as at a street cabinet (not shown). Street cabinets are typically used in the telecommunication system 15 as aggregators and distributors of communication cables that are usually employed to convey telephone and data services to a plurality of subscriber units at subscriber premises at different locations.

In a case where the communication cables are line pairs, the line pairs may also be used to remotely power the subscriber units, for example, from a central office (CO) (not shown) of the telecommunication system 15. The term "line pair" is used throughout the specification and claims to include telephone line twisted pairs that typically include copper pairs. A link that is provided between the CO and a subscriber unit over a line pair is typically referred to as a "local loop" or a "subscriber loop". Each local loop enables communication of data, voice and signaling over the corresponding line pair.

Referring, for example and without limiting the generality of the foregoing, to the apparatus 10 as located at a street cabinet or at any subscriber associated unit that aggregates and distributes line pairs, the apparatus 10 may preferably be connected to a plurality of line pairs (not shown). The plurality of line pairs may preferably be used convey electric power for powering appliances as described herein after. The electric power conveyed over the plurality of line pairs may be supplied by a corresponding plurality of power sources (not shown) that may be located, for example, at the CO. Preferably, the plurality of line pairs are conventional line pairs that are suitable for use in a telecommunication network.

Typically, the plurality of line pairs are used in the telecommunication system 15 to convey data, voice, signaling, electric power for powering the appliances or any combination thereof. The use of the plurality of line pairs for powering only is typically feasible because the street cabinet or the subscriber associated unit is typically connected to the CO via a bundle of line pairs that includes spare line pairs that are not used for communication of data, voice and signaling. Those spare line pairs are typically the plurality of line pairs mentioned above.

Preferably, the apparatus 10 includes a plurality of line pair terminations 20 respectively terminating the plurality of line pairs and an electric power aggregator 25. The electric power aggregator 25 is preferably operative to aggregate the electric power supplied via the plurality of line pairs to provide electric power suitable for powering an appliance (not shown), e.g. according to ETS 300 132-2, and the electric power supplied via each line pair of the plurality of line pairs does not exceed a pre-defined threshold, such as a threshold defined in international standard IEC60950-21 that is hereby incorporated herein by reference. The appliance may preferably, but not necessarily, include a communications appliance that may include a communications interface.

The electric power aggregator 25 preferably includes the following units: a plurality of separate power supervisors 30; a plurality of separate controllers 35; and a plurality of separate power stage converters 40. Each of the plurality of separate power supervisors 30, the plurality of separate controllers 35 and the plurality of separate power stage converters 40 is preferably operatively associated with a corresponding line pair termination 20 terminating a single line pair.

Preferably, each of the plurality of power supervisors 30 is operative independently of the other power supervisors 30, to control, share, sink and limit electric power provided via a corresponding line pair termination 20. The control decisions taken later on in this process will be based upon the identification of the input voltage determined by the corresponding power supervisors. Each separate controller 35 is preferably operatively associated with a corresponding power supervisor 30. Each controller 35 preferably operates independently from the other controls and includes power control circuitry such as a power width modulator (PWM) 45, a current sensing comparator 50 and a conventional opto-coupler 55. The PWM 45 and the comparator 50 may include, for example, conventional circuitry such as a device UCC3813-5 by Texas Instruments and related circuitry.

Each power stage converter 40 is preferably operatively associated with a corresponding controller 35 and is operative to convert an inputted voltage having a value within a pre-defined range to an output voltage that is acceptable by telecommunication standards, such as the telecommunication standard ETS 300 132-2 mentioned above and incorporated herein by reference. Each converter 40 may preferably include a transformer 60 and related circuitry as depicted in FIG. 1. The electric power aggregator 25 preferably aggregates the output voltages outputted by all the converters 40 to provide an aggregate output voltage $V_{out}$ that is acceptable by the telecommunication standards.

The apparatus 10 may also preferably include an alarm and logic unit 65 that is operative to generate an alarm indicating a loss of any one or more of the line pairs and/or low voltage output level. The alarm and logic unit 65 may preferably further be operative to generate an indication indicating that electric power is not received over at least one line pair.

Additionally, the apparatus 10 may include a disconnection unit 70 which is operative to detect that an output voltage $V_{out}$ resulting from aggregation of the electric power supplied via the plurality of line pairs is lower than an output voltage acceptable by the telecommunication standards.

In operation, electrical power is fed over the plurality of line pairs and received at the plurality of line pair terminations 20. At start up, the plurality of power sources places a low voltage on each line pair and wait for the apparatus 10 to present a signature on the line pairs to identify itself. After the power sources have verified that the apparatus 10 terminates the line pairs, the power sources raise the voltage over the line pairs so that electrical power is conveyed at steady state at a direct current I at an input voltage having a value within a range from $V_A$ to $V_B$, wherein the values of the current I and the input voltage are compliant with telecommunication standards for remote feeding of telecommunication circuits. $V_A$ and $V_B$ may vary from country to country but generally $V_A \geq 50$ VDC, $V_B \leq 320$ VDC, and $I \leq 60$ mA. In Europe for example, this range is typically between about 250V and 320V, as indicated in this FIG.

During the steady state, power supplied over any line pair will shut down in case one of the following events occurs: the line pair is short-circuited; leakage current is generated between any line in the line pair and ground; and voltage on the line pair deviates from an allowed voltage level range.

Preferably, during steady state, the apparatus 10 combines the electrical power supplied via each of the line pairs to provide a stable aggregate output voltage $V_{out}$ within a range from 42 VDC to 54 VDC in compliance with the telecommunication standard ETS 300 132-2. The electrical power at the output of the apparatus 10 may preferably be used to power the appliance.

By employing the separate power supervisors 30, the separate controllers 35 and the separate converters 40, the apparatus 10 separately controls the electric power supplied via each of the plurality of line pairs and maintains full galvanic isolation between all the line pairs in order to comply with the relevant safety standards. Additionally, the apparatus 10 sinks the maximum possible power on each individual line pair.

The electric power aggregator 25 preferably provides an artificial load to each of the line pairs to ensure that they draw current even when the appliance fed by the apparatus 10 does not require electrical power. This prevents false alarms in case a line pair does not draw electric power. Additionally, the electric power aggregator 25 may preferably perform the following: disconnect the aggregate output voltage $V_{out}$ if it exceeds the range from 42 VDC to 54 VDC; provide an alarm if a line pair fails; provide a "dying gasp" alarm prior to failure; and control LED (not shown) indications.

The apparatus 10 therefore provides the following advantages:
(1) Adaptation to power requirements and to a number of line pairs actually in use. If a line pair fails, the apparatus 10 may compensate by drawing additional power over the remaining line pairs as long as safety parameters per pair are not breached. Alternatively, when power requirements of the appliance increase, the apparatus 10 may automatically draw more power from the line pairs as long as the safety parameters per pair are not breached.
(2) Dynamic addition of line pairs. This enables to increase the maximum aggregate output voltage $V_{out}$.
(3) Independence of origin of the line pairs and a length of each line pair.
(4) Compliance with safety requirements and telecommunication standards.
(5) Ability to separately acknowledge termination on each line pair without exceeding limits on electric power drawn from each pair during start up.

It is appreciated that a plurality of the apparatus 10 may be combined in parallel to increase output power. Each apparatus 10 may aggregate power from, for example, 16 line pairs. The plurality of the apparatus 10 may be packaged separately or in a combined unit (not shown) that may be an independent unit or a unit embodied in a telecommunication device, such as a Digital Subscriber Line Access Mulitplexer (DSLAM) or a Remote Access Multiplexer (RAM).

Figure 2:
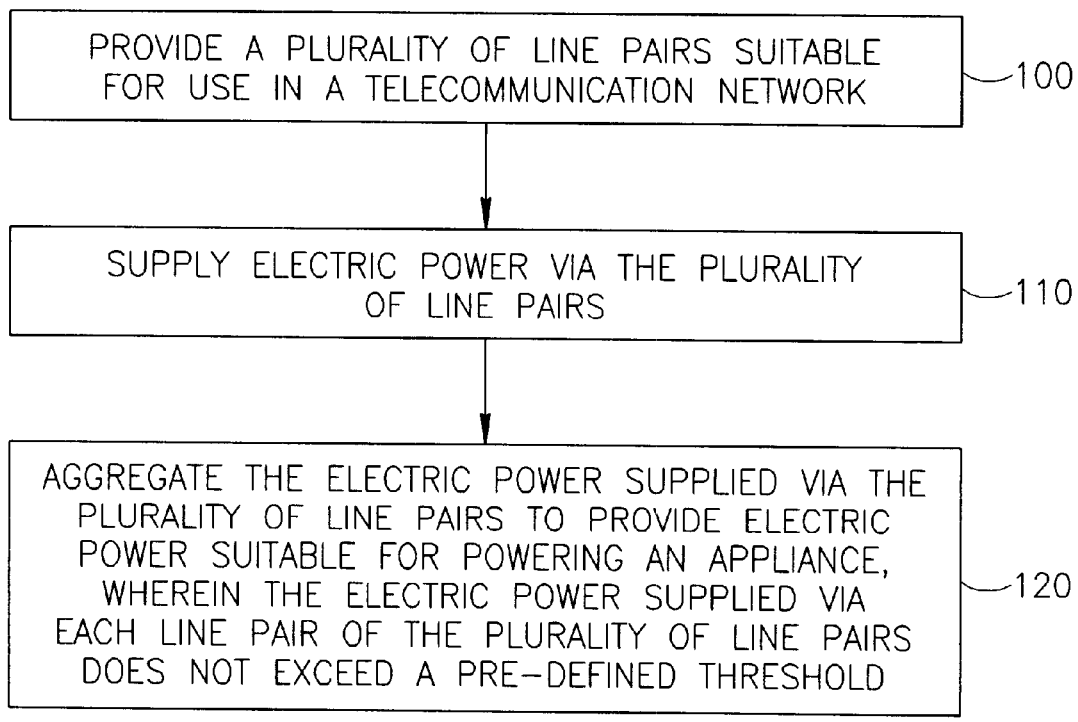
FIG. 2 is a simplified flowchart illustration of a preferred method of operation of the apparatus of FIG. 1.

Reference is now made to FIG. 2 which is a simplified flowchart illustration of a preferred method of operation of the apparatus 10 of FIG. 1.

A plurality of line pairs suitable for use in a telecommunication network are preferably provided (step 100). Electric power is preferably supplied via the plurality of line pairs (110) and aggregated (step 120) to provide electric power suitable for powering an appliance, wherein the electric power supplied via each line pair of the plurality of line pairs does not exceed a pre-defined threshold.

It is appreciated that various features of the invention that are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described herein above. Rather the scope of the invention is defined by the claims that follow.

What is claimed is:

1. A method for remote line powering in a telecommunication network comprising:
   supplying electric power via a plurality of line pairs that are suitable for use in said telecommunication network; and
   aggregating the electric power supplied via the plurality of line pairs to provide electric power suitable for powering an appliance, characterized in that the electric power supplied via each line pair of said plurality of line pairs does not exceed a pre-defined threshold.

2. The method according to claim 1 and wherein the electric power supplied via the plurality of line pairs is obtained by feeding along each line pair in said plurality of line pairs direct current I at an input voltage having a value within a range from $V_A$ to $V_B$, wherein the values of the current I and the input voltage are compliant with telecommunication standards for remote feeding of telecommunication circuits.

3. The method according to claim 2, further comprising the step of converting each said input voltage to an output voltage aggregated to provide an aggregate output voltage $V_{out}$ that is acceptable by said telecommunication standards.

4. The method according to claim 2, further comprising the step of converting each said input voltage to an output voltage that is acceptable by said telecommunication standards.

5. The method according to claim 3 wherein each said converting step comprises the step of converting said input voltage to said output voltage for each line pair independently from other line pairs in said plurality of line pairs.

6. The method according to claim 2 and wherein $V_A \geq 50$ VDC, $V_B \leq 320$ VDC, and $I \leq 60$ mA.

7. The method according to claim 3 and wherein said aggregate output voltage $V_{out}$ is within a range of from about 42 VDC to about 54 VDC.

8. Apparatus for remote line powering in a telecommunication network comprising:
   a plurality of line pair terminations terminating a corresponding plurality of line pairs that are suitable for use in said telecommunication network, the line pairs being operative to convey electric power supplied by a corresponding plurality of power sources; and
   an electric power aggregator operative to aggregate the electric power supplied via the plurality of line pairs to provide electric power suitable for powering an appliance, and to control that the electric power supplied via each line pair of said plurality of line pairs does not exceed a pre-defined threshold.

9. The apparatus according to claim 8 and wherein said electric power aggregator comprises a plurality of separate power supervisors, wherein each separate power supervisor is operatively associated with a corresponding one of said plurality of line pair terminations.

10. The apparatus according to claim 9 and wherein said electric power aggregator comprises a plurality of separate controllers, wherein each separate controller is operatively associated with a corresponding one of said plurality of separate power supervisors.

11. The apparatus according to claim 10 and wherein said electric power aggregator comprises a plurality of separate power stage converters, wherein each power stage converter is operatively associated with a corresponding one of said plurality of separate controllers and operative to convert an inputted voltage having a value in the range of from about 50 VDC to about 320 VDC, to an output voltage that is acceptable by telecommunication standards.

12. The apparatus according to claim 10 and wherein said plurality of separate power stage converters are operative in full electrical isolation from each other.

13. The apparatus according to claim 8, further comprising a disconnection unit operative to detect that an output voltage $V_{out}$ resulting from aggregation of the electric power supplied via the plurality of line pairs is lower than an output voltage acceptable according to telecommunication standards.

* * * * *